United States Patent
Hsu

(10) Patent No.: US 12,014,147 B2
(45) Date of Patent: Jun. 18, 2024

(54) COMMENT MANAGEMENT METHOD, SERVER AND READABLE STORAGE MEDIUM

(71) Applicant: HON HAI PRECISION INDUSTRY CO., LTD., New Taipei (TW)

(72) Inventor: Ming-Chuan Hsu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 435 days.

(21) Appl. No.: 17/333,250

(22) Filed: May 28, 2021

(65) Prior Publication Data

US 2021/0383073 A1    Dec. 9, 2021

(30) Foreign Application Priority Data

Jun. 3, 2020    (CN) .......................... 202010495914.5

(51) Int. Cl.
| | |
|---|---|
| G06F 7/00 | (2006.01) |
| G06F 16/31 | (2019.01) |
| G06F 16/332 | (2019.01) |
| G06F 40/10 | (2020.01) |
| G06F 40/35 | (2020.01) |
| G06Q 50/00 | (2012.01) |

(52) U.S. Cl.
CPC ............ *G06F 40/35* (2020.01); *G06F 16/325* (2019.01); *G06F 16/3329* (2019.01); *G06F 40/10* (2020.01); *G06Q 50/01* (2013.01)

(58) Field of Classification Search
CPC ........ G06F 40/35; G06F 16/35; G06F 16/325; G06F 16/3329; G06F 40/10; G06F 40/30; G06F 40/279; G06Q 50/01

USPC .................. 707/737, 741, 752, 758, 736
See application file for complete search history.

(56) References Cited

U.S. PATENT DOCUMENTS

| | | | | |
|---|---|---|---|---|
| 2012/0072937 A1* | 3/2012 | Ikeda | ..................... | G06F 16/48 725/10 |
| 2013/0216203 A1* | 8/2013 | Nakazawa | ............... | H04N 9/79 386/241 |
| 2013/0332385 A1* | 12/2013 | Kilroy | .................... | G06Q 30/02 705/347 |

(Continued)

FOREIGN PATENT DOCUMENTS

| CN | 101652769 A | 2/2010 |
|---|---|---|
| CN | 107729538 A | 2/2018 |
| CN | 109426949 A | 3/2019 |

(Continued)

OTHER PUBLICATIONS

Melanie Swan, "Blockchain: New Economic Blueprint and Introduction", book, Jun. 2018, pp. 96 and 103-104, ISBN: 9787513330619, New Star Press; Beijing, China.

*Primary Examiner* — Md I Uddin
(74) *Attorney, Agent, or Firm* — ScienBiziP, P.C.

(57) ABSTRACT

A comment management method applied to a server is provided. The method includes detecting comment parameters of an article. Whether or not to activate a comment management mechanism for the article is determined according to the comment parameters of the article. All comments of the article are managed by activating the comment management mechanism. Once an activation duration of the comment management mechanism is activated, the comment management mechanism is canceled when the activation duration reaches a preset duration.

17 Claims, 3 Drawing Sheets

(56) References Cited

U.S. PATENT DOCUMENTS

2017/0249384 A1* 8/2017 Kandylas .............. G06F 16/358

FOREIGN PATENT DOCUMENTS

| CN | 109889523 | A | | 6/2019 | | |
|---|---|---|---|---|---|---|
| CN | 110263562 | | | 9/2019 | | |
| CN | 110322209 | A | | 10/2019 | | |
| CN | 111160998 | B | * | 4/2020 | ............ | G06Q 40/04 |
| CN | 111831670 | A | * | 10/2020 | | |
| TW | 201901502 | A | | 1/2019 | | |
| TW | 202018562 | A | | 5/2020 | | |

* cited by examiner

COMMENT MANAGEMENT METHOD, SERVER AND READABLE STORAGE MEDIUM

FIELD

The present disclosure relates to computing technology, in particular to a comment management method, a server, and a readable storage medium.

BACKGROUND

A comment of an article is shorter than content of the article, such that it is easy to read. However, if a reader just reads the comments of the article and not reads the content of the article, the reader may get a misunderstanding on the article.

DETAILED DESCRIPTION

In order to provide a more clear understanding of the objects, features, and advantages of the present disclosure, the same are given with reference to the drawings and specific embodiments. It should be noted that the embodiments in the present disclosure and the features in the embodiments may be combined with each other without conflict.

In the following description, numerous specific details are set forth in order to provide a full understanding of the present disclosure. The present disclosure may be practiced otherwise than as described herein. The following specific embodiments are not to limit the scope of the present disclosure.

Unless defined otherwise, all technical and scientific terms herein have the same meaning as used in the field of the art technology as generally understood. The terms used in the present disclosure are for the purposes of describing particular embodiments and are not intended to limit the present disclosure.

Figure 1:
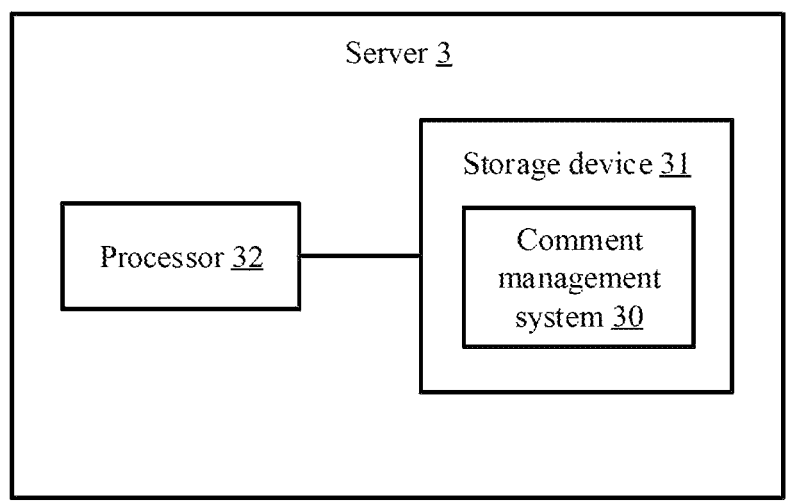
FIG. 1 illustrates a schematic diagram of a server according to one embodiment of the present disclosure.

FIG. 1 illustrates a schematic diagram of a server of the present disclosure.

In at least one embodiment, the server 3 includes a storage device 31, at least one processor 32. The storage device 31 and the at least one processor 32 are in electrical communication with each other.

Those skilled in the art should understand that the structure of the server 3 shown in FIG. 1 does not constitute a limitation of the embodiment of the present disclosure. The server 3 can further include more or less other hardware or software than that shown in FIG. 1, or the server 3 can have different component arrangements. For example, the server 3 may further include a display.

It should be noted that the server 3 is merely an example. If another kind of server can be adapted to the present disclosure, it should also be included in the protection scope of the present disclosure, and incorporated herein by reference In some embodiments, the storage device 31 may be used to store program codes and various data of computer programs. For example, the storage device 31 may be used to store a comment management system 30 installed in the server 3 and implement completion of storing programs or data during an operation of the server 3. The storage device 31 may include Read-Only Memory (ROM), Programmable Read-Only Memory (PROM), and Erasable Programmable Read-Only Memory. EPROM), One-time Programmable Read-Only Memory (OTPROM), Electronically-Erasable Programmable Read-Only Memory (EEPROM), Compact Disc (Compact Disc) Read-Only Memory (CD-ROM) or other optical disk storage, disk storage, magnetic tape storage, or any other non-transitory computer-readable storage medium that can be used to carry or store data.

In some embodiments, the at least one processor 32 may be composed of an integrated circuit. For example, the at least one processor 32 can be composed of a single packaged integrated circuit or can be composed of multiple packaged integrated circuits with the same function or different function. The at least one processor 32 includes one or more central processing units (CPUs), one or more microprocessors, one or more digital processing chips, one or more graphics processors, and various control chips. The at least one processor 32 is a control unit of the server 3. The at least one processor 32 uses various interfaces and lines to connect various components of the server 3, and executes programs or modules or instructions stored in the storage device 31, and invokes data stored in the storage device 31 to perform various functions of the server 3 and to process data, for example, perform a function of managing comments of an article (for details, see the description of FIG. 3).

In this embodiment, the comment management system 30 can include one or more modules. The one or more modules are stored in the storage device 31 and are executed by at least one processor (e.g. processor 32 in this embodiment), such that a function of managing comments of an article (for details, see the introduction to FIG. 3 below) is achieved.

Figure 2:
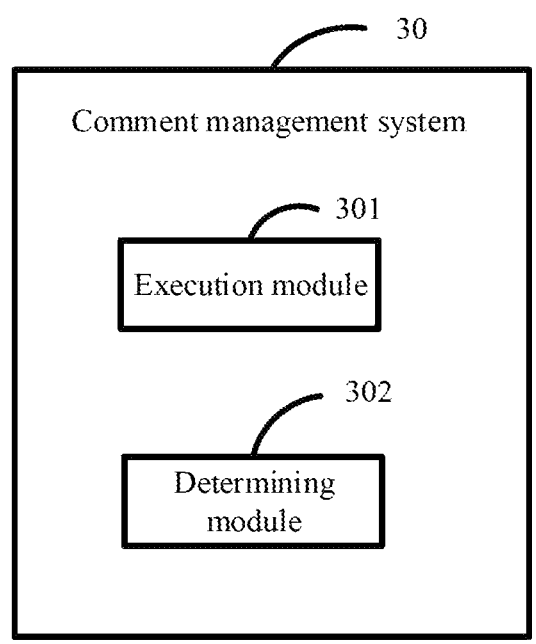
FIG. 2 shows one embodiment of modules of a comment management system of the present disclosure.

In this embodiment, the comment management system 30 can include a plurality of modules. Referring to FIG. 2, the plurality of modules includes a execution module 301, a determining module 302. The module referred to in the present disclosure refers to a series of computer-readable instructions that can be executed by at least one processor (for example, the processor 32), and can complete functions, and can be stored in a storage device (for example, the storage device 31 of the server 3). In this embodiment, functions of each module will be described in detail with reference to FIG. 3.

Figure 3:
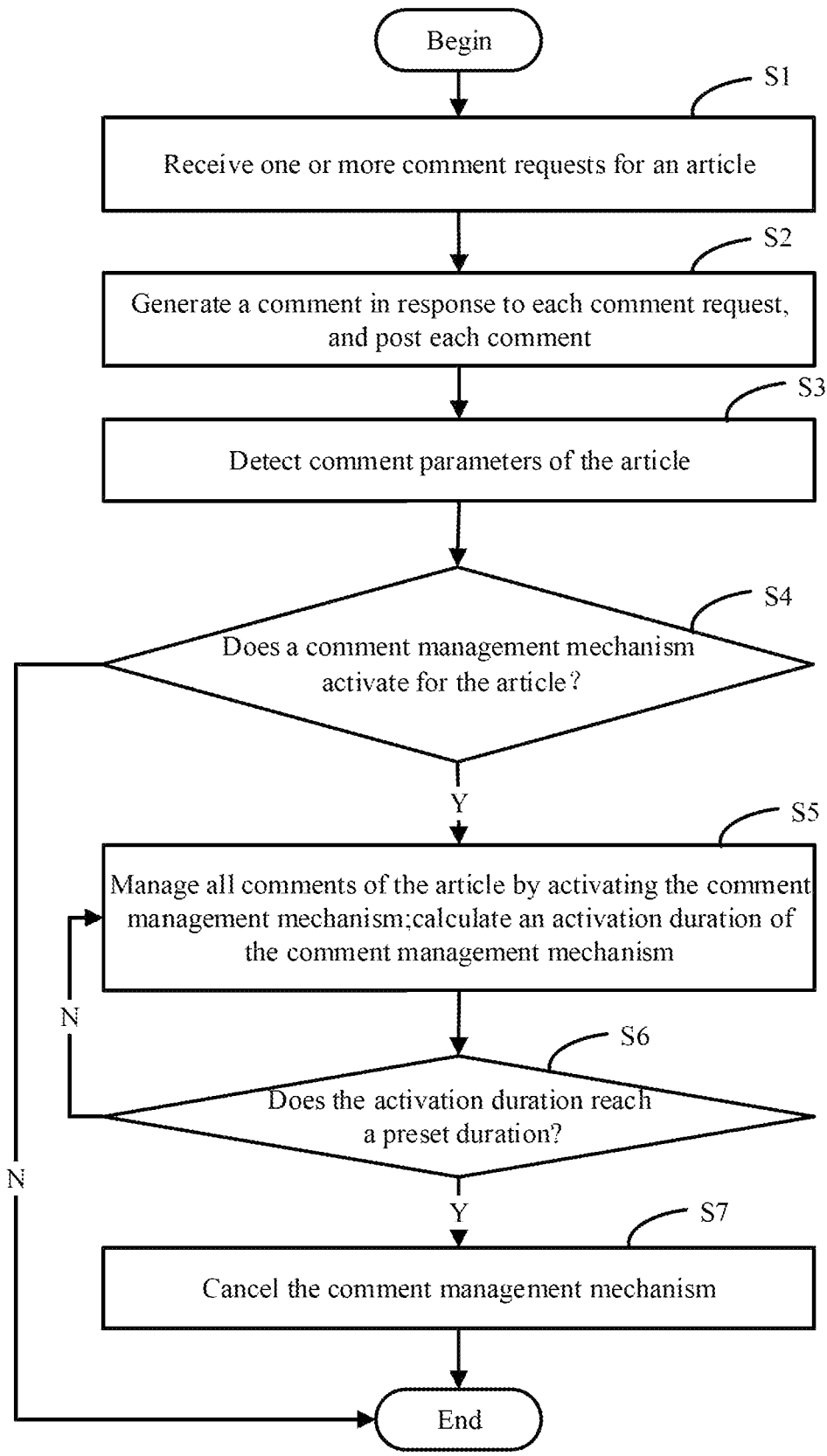
FIG. 3 shows a flow chart of one embodiment of a comment management method of the present disclosure.

In this embodiment, an integrated unit implemented in a form of a software module can be stored in a non-transitory readable storage medium. The above modules include one or more computer-readable instructions. The server 3 or a processor implements the one or more computer-readable instructions, such that the method for managing comments of an article shown in FIG. 3 is achieved.

In a further embodiment, referring to FIG. 2, the at least one processor 32 can execute an operating system of the server 3, various types of applications (such as the comment management system 30 described above), program codes, and the like.

In a further embodiment, the storage device 31 stores program codes of a computer program, and the at least one processor 32 can invoke the program codes stored in the storage device 31 to achieve related functions. For example, each module of the comment management system 30 shown in FIG. 2 is program code stored in the storage device 31.

Each module of the comment management system 30 shown in FIG. 2 is executed by the at least one processor 32, such that the functions of the modules are achieved, and the purpose of managing comments of an article (see the description of FIG. 3 below for details) is achieved.

In one embodiment of the present disclosure, the storage device 31 stores one or more computer-readable instructions, and the one or more computer-readable instructions are executed by the at least one processor 32 to achieve a purpose of managing comments of an article. Specifically, the computer-readable instructions executed by the at least one processor 32 to achieve the purpose of managing comments of an article is described in detail in FIG. 3 below.

It should be noted that, in other embodiments, the comment management system 30 may also be implemented as an embedded system with a storage device, a processor, and other necessary hardware or software.

FIG. 3 is a flowchart of a comment management method according to a preferred embodiment of the present disclosure.

In this embodiment, the comment management method can be applied to the server 3. For the server 3 that requires managing comments of an article, the server 3 can be directly integrated with the function of managing comments of an article. The server 3 can also achieve the function of managing comments of an article by running a Software Development Kit (SDK).

FIG. 3 shows a flow chart of one embodiment of a comment management method. Referring to FIG. 3, the method is provided by way of example, as there are a variety of ways to carry out the method. The method described below can be carried out using the configurations illustrated in FIG. 1, for example, and various elements of these figures are referenced in explanation of method. Each block shown in FIG. 3 represents one or more processes, methods, or subroutines, carried out in the method. Furthermore, the illustrated order of blocks is illustrative only and the order of the blocks can be changed. Additional blocks can be added or fewer blocks can be utilized without departing from this disclosure. The example method can begin at block S1.

At block S1, the execution module 301 receives one or more comment requests for an article.

Each comment request is a request for commenting on the article.

In this embodiment, each comment request includes information such as a user name, comment content, and a comment location.

In this embodiment, an external device (such as a mobile phone or a personal computer, not shown in the figure) that is communicatively connected with the server 3, can send the comment request to the server 3. Thus, the execution module 301 can receive the comment request.

At block S2, the execution module 301 generates a comment in response to each comment request, and posts each comment. For example, each comment is posted to a comment area of the article.

Specifically, each comment includes the user name, comment content, and the comment location.

The execution module 301 also sets a current system time of the server 3 as a post time of the comment when the comment is successfully posted. The execution module 301 stores the post time of each comment in the storage device 31. In one embodiment, the execution module 301 posts each comment according to a receiving time of receiving the corresponding comment request. In one embodiment, the earlier the receiving time of receiving a comment request, the earlier the corresponding comment is posted.

At block S3, the execution module 301 detects comment parameters of the article.

In one embodiment, the comment parameters of the article refers to include, but not limited to, a total number of comments of the article that is posted within a preset time period, the comment content of each of the total number of comments, and/or a combination thereof.

In one embodiment, a starting time of calculating the preset time period equals a publication time of the article, and a time length of the preset time period equals a specified time length (for example, 1 minute, 2 minutes, or other time). For example, the preset time period refers to within 1 minute after the article is published.

At block S4, the determining module 302 determines, according to the comment parameters of the article, whether or not to activate a comment management mechanism for the article. When it is determined that the comment management mechanism needs to be activated for the article, block S5 is executed.

In one embodiment, when the total number of comments of the article posted in the preset time period is greater than a preset value (for example, 20), the determining module 302 determines that the comment management mechanism needs to be activated for the article. For example, for an article which is published at 9:00 am, when it is detected that more than 20 comments have been posted at 9:01 am, it is determined that the comment management mechanism needs to be activated for the article.

In other embodiments, when the total number of comments of the article posted in the preset time period is greater than the preset value, and the comment content of each comment includes at least one specified keyword, the determining module 302 determines that the comment management mechanism must be activated for the article.

In this embodiment, the at least one specified keyword may refer to words which relate to an advertisement, or words which relate to the politics, or politically-sensitive words.

At block S5, the execution module 301 manages all comments of the article by activating the comment management mechanism. The execution module 301 calculates a duration of activation of the comment management mechanism (for a clear and simple description of the present disclosure, the duration of activation of the comment management mechanism is hereinafter referred to as "activation duration").

In one embodiment, the starting time of calculating the activation duration is when the determining module 302 determines that the comment management mechanism needs to be activated for the article.

In one embodiment, the activation of the comment management mechanism means the control of all the comments of the article. On the contrary, the cancel of the comment management mechanism means not control all the comments of the article.

In one embodiment, the manage all comments of the article by activating the comment management mechanism includes (a1)-(a4):

(a1) Covering all comments of the article.

In one embodiment, the cover all comments of the article refers to replace all the comments in the comment area of the article with preset texts such as "*". In one embodiment, the execution module 301 reads all the comments in the comment area of the article and the post time of each comment before replace all the comments in the comment area of the article with the preset texts. The execution module 301 stores all the read comments and corresponding post times in the storage device 31.

In one embodiment, the execution module 301 may also upload all the read comments to a blockchain.

Specifically, the uploading all the read comments to the blockchain includes (a11)-(a14):

(a11) Calculating a hash value corresponding to each read comment using a hash algorithm. To facilitate a clear and simple description of the present disclosure, the hash value corresponding to each read comment is hereinafter referred to as "first hash value".

In one embodiment, the calculating the first hash value may refer to calculating the first hash value based on the user name, the comment content, and the comment location included in each read comment using the hash algorithm.

For example, a hash value A1 corresponding to a comment A is calculated based on the user name, the comment content, and the comment location included in the comment A using the hash algorithm. A hash value B1 corresponding to a comment B is calculated based on the user name, the comment content, and the comment location included in the comment B using the hash algorithm.

(a12) Uploading each first hash value to the blockchain.

(a13) Receiving, from the blockchain, a second hash value corresponding to each first hash value, the second hash value being calculated by the blockchain based on the first hash value.

It should be noted that after receiving each first hash value, the blockchain calculates a second hash value based on each first hash value using the hash algorithm, and returns each second hash value to the server 3. Therefore, the execution module 301 receives the second hash value corresponding to each first hash value.

(a14) Associating each read comment with the corresponding first hash value and the second hash value. Therefore, when the execution module 301 needs to verify whether a comment in the comment area of the article has been modified, the execution module 301 can obtain the corresponding first hash value from the blockchain according to the second hash value, and verify each comment based on the first hash value obtained from the blockchain to determine whether the comment is modified or deleted.

For example, suppose that the comment A is associated with the first hash value A1 and the second hash value A2; when it is necessary to verify whether the comment A in the comment area of the article has been modified, the execution module 301 obtains a first hash value A1' from the blockchain according to the second hash value A2. If the first hash value A1' is the same as the first hash value A1, the comment A is not modified. Conversely, if the first hash value A1' is different from the first hash value A1, it is considered that the comment A has been modified.

(a2) Receiving one or more new comment request for the article.

Each new comment request refers to a comment request for commenting on the article which is received during the period when the comment management mechanism is activated.

Similarly, each new comment request includes the user name, the comment content, and the comment location.

(a3) Generating a new comment corresponding to each new comment request.

Each new comment refers to a comment generated according to the corresponding new comment request that is received during the period when the comment management mechanism is activated.

Similarly, each new comment includes the user name, the comment content, and the comment location. Specifically, the execution module 301 also uses the current system time of the server 3 as a comment time of the new comment when the new comment is generated. The execution module 301 also stores the new comment together with the corresponding comment time in the storage device 31.

(a4) Uploading each new comment to the blockchain.

Specifically, the execution module 301 calculates the hash value corresponding to each new comment using the hash algorithm (for clear and simple description of the present disclosure, the hash value corresponding to each new comment is hereinafter referred to as "third hash value"); uploads each third hash value to the blockchain; and receives a fourth hash value corresponding to each third hash value from the blockchain, the fourth hash value is calculated by the blockchain based on the third hash value using the hash algorithm; and associates each new comment with the corresponding third hash value and fourth hash value. Therefore, when the new comment needs to be obtained from the blockchain, the execution module 301 can obtain the new comment from the blockchain according to the corresponding fourth hash value.

It should be noted that activating the comment management mechanism means that blocks (a1)-(a4) are executed. A cancellation of the comment management mechanism means that blocks (a1)-(a4) will not be executed.

At block S6, the determining module 302 determines whether the activation duration reaches a preset duration (for example, 10 minutes). When the activation duration reaches the preset duration, block S7 is executed.

At block S7, when the activation duration reaches the preset duration, the execution module 301 cancels the comment management mechanism, i.e., no longer manages the comments of the article.

In one embodiment, when the comment management mechanism is canceled, the execution module 301 displays all the covered comments and displays all new comments.

Specifically, the execution module 301 may display all the covered comments (i.e., the comments that are managed) in the comment area of the article according to a sequence of a post time corresponding to each covered comment (for example, the execution module 301 can remove the texts such as "*", and obtains the comments that are stored in the storage device 31, and displays the comments in the comment area of the article according to the post time corresponding to each comment). The execution module 301 can further display all new comments in the comment area of the article according to a comment time corresponding to each new comment.

From the above blocks of the present disclosure, we can see that the present disclosure determines whether or not to activate the comment management mechanism according to the total number of comments after the article is published and the keywords included in the comment content. The present disclosure effectively avoids a comment direction of a large number of comments posted immediately after the article is published being affect the comment direction of later posted comments. In addition, the present disclosure uploads the comment to the blockchain, such that when a commenter modifies or deletes the comment during the period of covering the comment (i.e., the period of activation of the comment management mechanism), evidence of the modification or deletion of the comment is available and can be found.

The above description is only embodiments of the present disclosure, and is not intended to limit the present disclosure, and various modifications and changes can be made to the present disclosure. Any modifications, equivalent substitutions, improvements, etc. made within the spirit and scope of the present disclosure are intended to be included within the scope of the present disclosure.

What is claimed is:

1. A comment management method applied to a server, the method comprising:
   detecting comment parameters of an article;
   determining, according to the comment parameters of the article, whether or not to activate a comment management mechanism for the article;
   managing all comments of the article by activating the comment management mechanism;
   calculating an activation duration of the comment management mechanism; and
   canceling the comment management mechanism when the activation duration reaches a preset duration;
   wherein managing all comments of the article by activating the comment management mechanism comprises:
   reading all comments in a comment area of the article and a post time of each read comment; and covering all the read comments in the comment area of the article; and
   uploading all the read comments to a blockchain, comprising: calculating a first hash value corresponding to each read comment based on a user name, a comment content, and a comment location comprised in each read comment using a hash algorithm; uploading each first hash value to the blockchain; receiving, from the blockchain, a second hash value corresponding to each first hash value, the second hash value being calculated by the blockchain based on the first hash value; associating each read comment with the corresponding first hash value and the second hash value; obtaining the corresponding first hash value from the blockchain according to the second hash value for a comment needs to be verified, and verify the comment needs to be verified based on the first hash value obtained from the blockchain;
   wherein the method further comprises:
   receiving one or more comment requests for the article; and
   generating a comment in response to each comment request, and posting each comment to the comment area of the article, wherein the earlier a receiving time of receiving the comment request, the earlier a corresponding comment is posted.

2. The comment management method according to claim 1, wherein the comment parameters of the article comprise a total number of comments of the article that is posted within a preset time period, and a comment content of each of the total number of comments.

3. The comment management method according to claim 2, further comprising:
   determining that the comment management mechanism needs to be activated for the article when a preset condition is met, the preset condition comprising the total number of comments of the article posted in the preset time period being greater than a preset value, and the comment content of each comment comprising at least one predetermined keyword.

4. The comment management method according to claim 3, wherein the at least one predetermined keyword comprises words related to an advertisement.

5. The comment management method according to claim 1, further comprising:
   covering all the read comments in the comment area of the article by replacing all the read comments in the comment area of the article with preset texts;
   receiving one or more new comment request for the article;
   generating a new comment corresponding to each new comment request; and
   uploading each new comment to the blockchain; and
   displaying all the covered comments and displays all new comments when the comment management mechanism is canceled.

6. The comment management method according to claim 5, further comprising:
   calculating a third hash value corresponding to each new comment using a hash algorithm;
   uploading each third hash value to the blockchain;
   receiving a fourth hash value corresponding to each third hash value from the blockchain, wherein the fourth hash value is calculated by the blockchain based on the third hash value using the hash algorithm; and
   associating each new comment with the corresponding third hash value and fourth hash value.

7. The comment management method according to claim 6, further comprising:
   obtaining the new comment from the blockchain according to the corresponding fourth hash value.

8. A server comprising:
   a storage device;
   at least one processor; and
   the storage device storing one or more programs, which when executed by the at least one processor, cause the at least one processor to:
   detect comment parameters of an article;
   determine, according to the comment parameters of the article, whether or not to activate a comment management mechanism for the article;
   manage all comments of the article by activating the comment management mechanism;
   calculate an activation duration of the comment management mechanism; and
   cancel the comment management mechanism when the activation duration reaches a preset duration;
   wherein managing all comments of the article by activating the comment management mechanism comprises:
   reading all comments in a comment area of the article and a post time of each read comment; and covering all the read comments in the comment area of the article; and
   uploading all the read comments to a blockchain, comprising: calculating a first hash value corresponding to each read comment based on a user name, a comment content, and a comment location comprised in each read comment using a hash algorithm; uploading each first hash value to the blockchain; receiving, from the blockchain, a second hash value corresponding to each first hash value, the second hash value being calculated by the blockchain based on the first hash value; associating each read comment with the corresponding first hash value and the second hash value; obtaining the corresponding first hash value from the blockchain according to the second hash value for a comment needs to be verified, and verify the comment needs to be verified based on the first hash value obtained from the blockchain;
   wherein the at least one processor is further caused to:
   receive one or more comment requests for the article; and
   generate a comment in response to each comment request, and posting each comment to the comment area of the article, wherein the earlier a receiving time of receiving the comment request, the earlier a corresponding comment is posted.

9. The server according to claim 8, wherein the comment parameters of the article comprise a total number of comments of the article that is posted within a preset time period, and a comment content of each of the total number of comments.

10. The server according to claim 9, wherein the at least one processor is further caused to: determine that the comment management mechanism needs to be activated for the article when a preset condition is met, the preset condition comprising the total number of comments of the article posted in the preset time period being greater than a preset value, and the comment content of each comment comprising at least one predetermined keyword.

11. The server according to claim 10, wherein the at least one predetermined keyword comprises words related to an advertisement.

12. The server according to claim 8, wherein the at least one processor is further caused to:
cover all the read comments in the comment area of the article by replacing all the read comments in the comment area of the article with preset texts;
receive one or more new comment request for the article;
generate a new comment corresponding to each new comment request; and
upload each new comment to the blockchain; and
display all the covered comments and displays all new comments when the comment management mechanism is canceled.

13. The server according to claim 12, wherein the at least one processor is further caused to:
calculate a third hash value corresponding to each new comment using a hash algorithm;
upload each third hash value to the blockchain;
receive a fourth hash value corresponding to each third hash value from the blockchain, wherein the fourth hash value is calculated by the blockchain based on the third hash value using the hash algorithm; and
associate each new comment with the corresponding third hash value and fourth hash value.

14. The server according to claim 13, wherein the at least one processor is further caused to:
obtain the new comment from the blockchain according to the corresponding fourth hash value.

15. A non-transitory storage medium having instructions stored thereon, when the instructions are executed by a processor of a server, the processor is configured to perform a comment management method, wherein the method comprises:
detecting comment parameters of an article;
determining, according to the comment parameters of the article, whether or not to activate a comment management mechanism for the article;
managing all comments of the article by activating the comment management mechanism;
calculating an activation duration of the comment management mechanism; and
canceling the comment management mechanism when the activation duration reaches a preset duration;
wherein managing all comments of the article by activating the comment management mechanism comprises:
reading all comments in a comment area of the article and a post time of each read comment; and covering all the read comments in the comment area of the article; and
uploading all the read comments to a blockchain, comprising: calculating a first hash value corresponding to each read comment based on a user name, a comment content, and a comment location comprised in each read comment using a hash algorithm; uploading each first hash value to the blockchain; receiving, from the blockchain, a second hash value corresponding to each first hash value, the second hash value being calculated by the blockchain based on the first hash value; associating each read comment with the corresponding first hash value and the second hash value; obtaining the corresponding first hash value from the blockchain according to the second hash value for a comment needs to be verified, and verify the comment needs to be verified based on the first hash value obtained from the blockchain;
wherein the method further comprises:
receiving one or more comment requests for the article; and
generating a comment in response to each comment request, and posting each comment to the comment area of the article, wherein the earlier a receiving time of receiving the comment request, the earlier a corresponding comment is posted.

16. The non-transitory storage medium according to claim 15, wherein the comment parameters of the article comprise a total number of comments of the article that is posted within a preset time period, and a comment content of each of the total number of comments.

17. The non-transitory storage medium according to claim 15, wherein the method further comprises:
determining that the comment management mechanism needs to be activated for the article when a preset condition is met, the preset condition comprising the total number of comments of the article posted in the preset time period being greater than a preset value, and the comment content of each comment comprising at least one predetermined keyword.

* * * * *